G. H. HAMMER.
Fastening for Fruit Cans.

No. 55,953. Patented June 26, 1866.

Witnesses:

Inventor:
Geo. H. Hammer
By W. C. Dodge
Atty.

UNITED STATES PATENT OFFICE.

GEORGE H. HAMMER, OF NEWVILLE, ASSIGNOR TO HIMSELF, D. J. BROUGHER, AND WM. A. MIDDLETON, OF HARRISBURG, PA.

IMPROVEMENT IN FASTENINGS FOR FRUIT-CANS.

Specification forming part of Letters Patent No. 55,953, dated June 26, 1866.

*To all whom it may concern:*

Be it known that I, G. H. HAMMER, of Harrisburg, in the county of Dauphin and State of Pennsylvania, have invented certain new and useful Improvements in Self-Sealing Fruit-Cans; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use the invention, I will proceed to describe it.

My invention consists in providing fruit cans and jars with a bail so arranged that, when placed in position, it shall press the cover down tight and hold it securely in place.

Figure 1:
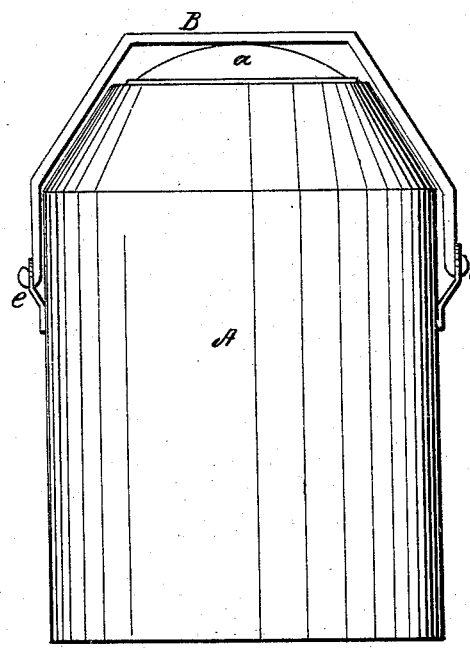
Figure 2:
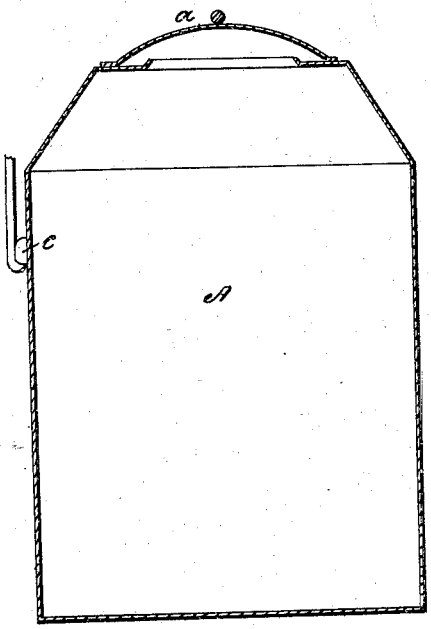

Figure 1 is a side elevation of a metal can with my improvement applied, and Fig. 2 is a vertical section of a modification adapted to suit jars made of glass or earthenware.

A represents the body of a can or jar, which may be made of any suitable material. The upper portion has its sides inclined inward, as shown, for the purpose of enabling it to be more easily and thoroughly cleaned. If made of metal, I attach an ear to each side, as shown in Fig. 1, and in these is hooked a bail, B, which may consist of a simple piece of wire.

The cover *a* is made convex on its outer surface, for the twofold purpose of giving it greater stiffness or strength and also for the purpose of having the bail B act upon it as an incline or wedge when raised to a vertical position, and thus press it down tight in contact with the can, and hold it there until removed. A slight indentation should be made upon the top of the cover to prevent the bail from being easily or accidentally displaced; and, if necessary, the cover may be stiffened by soldering or otherwise attaching pieces of wire on its outer surface, upon which the bail shall impinge.

It will be understood that rubber packing or wax will be used between the cover and the top of the can to render it air-tight.

When made of glass or earthenware a projection or lug will be formed on the sides in place of the ears, as shown at *c*, and the ends of the bail turned inward, so as to engage under the lug *c*, as shown in Fig. 2.

In order to hold the ends of the bail in place and prevent it from being accidentally displaced, a notch or recess should be formed on the under side of the lug *c* for the bail to engage in.

I claim—

Securing the cover *a* by means of the bail B, attached to the ears *e* or lugs *c*, substantially as shown and described.

GEORGE H. HAMMER.

Witnesses:
 W. C. DODGE,
 C. H. ELLERBECK.